(12) United States Patent
Galbiati

(10) Patent No.: US 7,705,548 B2
(45) Date of Patent: Apr. 27, 2010

(54) ENHANCEMENT OF THE EFFICIENCY OF ENERGY RECOVERY DURING SPINDLE MOTOR STEP-UP PHASES FOR PARKING THE R/W HEAD OF A DISK STORAGE DEVICE UPON EXTERNAL SUPPLY FAILURE

(75) Inventor: Ezio Galbiati, Agnadello (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 374 days.

(21) Appl. No.: 11/754,686

(22) Filed: May 29, 2007

(65) Prior Publication Data
US 2008/0303458 A1 Dec. 11, 2008

(30) Foreign Application Priority Data
May 30, 2006 (EP) ................... 06425368

(51) Int. Cl.
*H02K 7/14* (2006.01)
(52) U.S. Cl. .................... 318/5; 318/3; 318/4; 318/500; 360/75
(58) Field of Classification Search ...... 318/3, 318/4, 500, 5; 360/75
See application file for complete search history.

(56) References Cited
U.S. PATENT DOCUMENTS

| | | | |
|---|---|---|---|
| 5,508,874 A * | 4/1996 | Williams et al. ............. 361/92 |
| 5,969,899 A * | 10/1999 | Utenick et al. ........... 360/78.04 |
| 6,441,681 B1 * | 8/2002 | White et al. ................ 327/545 |
| 6,560,057 B1 * | 5/2003 | Klaassen et al. .............. 360/75 |
| 7,068,460 B2 * | 6/2006 | Brenden et al. ............... 360/75 |
| 7,274,529 B2 * | 9/2007 | Ho et al. ....................... 360/75 |
| 2003/0231875 A1 | 12/2003 | Masino .................... 388/928.1 |
| 2006/0007581 A1 | 1/2006 | Brenden et al. ............... 360/75 |

FOREIGN PATENT DOCUMENTS

| | | |
|---|---|---|
| EP | 0973252 | 1/2000 |
| WO | 97/47007 | 12/1997 |

* cited by examiner

Primary Examiner—Bentsu Ro
Assistant Examiner—David S Luo
(74) Attorney, Agent, or Firm—Lisa K. Jorgenson; Allen, Dyer, Doppelt, Milbrath & Gilchrist, P.A.

(57) ABSTRACT

Energy recovery during recirculation phases of the phase windings of a multiphase spindle motor is increased when all the MOSFETs of the output bridge stage associated therewith are turned off (tristated) for charging a hold capacitor. This is accomplished by allowing the recirculation of the motor currents through the same MOSFETs of the output bridge stage that are turned on during the current recirculation phases. Recirculation of the currents and the charging of the hold capacitor takes place through fully saturated power MOSFETs.

23 Claims, 8 Drawing Sheets

ENHANCEMENT OF THE EFFICIENCY OF ENERGY RECOVERY DURING SPINDLE MOTOR STEP-UP PHASES FOR PARKING THE R/W HEAD OF A DISK STORAGE DEVICE UPON EXTERNAL SUPPLY FAILURE

FIELD OF THE INVENTION

The present invention relates in general to the drive circuits of a multiphase electric motor, and more particularly, to the enhancement of the efficiency of energy recovery from a free-wheeling multiphase spindle motor upon interruption of the power supply for charging a hold capacitor for sustaining the powering of an emergency routine actuator. The invention is particularly useful in disk storage devices, and typically in a hard disk drive for safely parking the pick ups upon an accidental interruption in the power supply.

BACKGROUND OF THE INVENTION

In hark disk drives, the ramp loading (parking) of the pick up carrying arm, in case of an external interruption of the power supply to the hard disk drive, is made possible by exploiting the spindle motor as a generator. The voltage of the generator depends on the speed of rotation and the electrical constant of the motor. By rectifying the back electromotive forces (BEMF) induced in the phase windings of the motor, a rectified charge current is forced through a hold capacitor connected between the power supply leaves of the output drive bridge stage of the multiphase spindle motor and a voice coil motor for moving the pick up arm to power the latter for the time needed for safely parking the pick up carrying arm.

FIG. 1 depicts a typical power control device of a hard disk drive. The externally applied supply voltage VCV powers the output bridge stages of the spindle motor and the VCM motor vary according to the application. In desktop applications, it is generally 12V while in lap top applications it is generally 5V.

The power control device, besides integrating the control circuitry of the two motors, spindle and VCM, includes other functional blocks such as the voltage regulators, the power monitor, the serial interface and the ISO-Fet device. The ISO-Fet is an internal element that isolates the internal power supply node from the external supply VCV when the latter is interrupted.

The turning on of the ISO-Fet device is controlled by the POR signal that becomes active when all the internally monitored voltages are at a correct level, thus turning on the ISO-Fet. Therefore, if accidentally the external power supply voltage VCV is no longer present, the back electromotive forces that are induced in the windings of the rotating spindle motor are rectified by the intrinsic current recirculation diodes of the six power MOSFETs of the output bridge stage of the spindle motor. This maintains the inner power supply rail Vmotor at a level sufficient to power the control circuitry of the VCM motor to safely park the pick up carrying arm.

In many desk top applications (12V) and even more so in mobile applications (5V), the voltage obtained by rectifying through the intrinsic diodes of the integrated structures of the six power MOSFETs could be insufficient to provide a sufficient level of rectified voltage to ensure a correct functioning of the circuitry and of the VCM to safely park the pick ups.

To enhance the efficiency of recovery of the back electromotive force induced in the phase windings of the spindle motor, two approaches are commonly followed. They are synchronous rectifying of the BEMF of the spindle motor, and step-up of the spindle motor.

According to the first approach, the rectifying of the BEMF of the spindle motor takes place in an active fashion through the sequential turning on of two MOSFETs of the output bridge stage of the spindle motor synchronously with the three BEMFs that are sequentially reduced in the respective three phase windings of the three phase spindle motor depicted in FIG. 1.

According to the second approach, instead of the output bridge stage being kept in a high impedance (tristate) condition, it is continuously switched from a tristate condition to a condition of braking of the motor at a relatively high frequency, e.g., at 16 KHz or above, so as to be outside the acoustic band.

In this way, when the output stage is in a condition of braking, either with all the low side MOSFETs turned on or all the high side MOSFETs turned on, the windings of the spindle motor are in a short circuit condition. Therefore, all three BEMFs contribute to generate current in the motor windings. Thereafter, when the output stage is driven again to a tristate condition, the motor current generated during the phase of braking recirculates through the intrinsic diodes of the integrated structures of the six power MOSFETs, thus charging the hold capacitor C3 connected to the V motor node.

Referring now to the circuit diagram of FIG. 2, the step-up function of the spindle motor may be obtained by forcing in a stable manner to a low logic level the drive input nodes InU, InV and InW, while the enable inputs EnU, EnV and EnW are simultaneously driven to a low logic value and to a high logic value at the step-up frequency (>16 KHz). In this way, when the enable inputs are all in a high logic state, the output stage will be in a brake configuration with all the low side driver transistors turned on. When the enable inputs are at a low logic level, the output stage will be in a tristate configuration.

By forcing the inputs InU, InV and InW to a stable high logic level, an alternating condition of braking and tristate will always be obtained. But in this case, the brake configuration will be implemented by turning on all the high side driver transistors of the output stage.

FIG. 3 shows the timing diagram of the input and enable signals of the output bridge stage of the spindle motor to implement the step-up. The phase of braking is implemented by turning on the low side drivers.

The diagrams of FIGS. 4a and 4b, respectively show the phase of braking and the phase of tristating to better clarify the step-up function. In the representation of FIGS. 4a and 4b, reference is made to one of the six possible configurations of direction of the currents used in the rotating spindle motor during the phase of braking.

During the braking phase, all the low side MOSFETs are turned on, thus short circuiting the phase windings of the motor. In this configuration, the three BEMFs produce three currents of polarity and value that are a function of the angular position of the rotor. In the representations of FIGS. 4a and 4b, the current of the U phase is entering the motor, while the currents in the phase windings V and W exit the motor.

During the successive tristate phase, all the MOSFETs are turned off, and therefore, the three currents in the windings of the motor start to recirculate through the intrinsic diodes of the integrated structures of the power MOSFETs. More precisely, the outgoing currents from the windings V and W flow toward the V motor rail through the intrinsic diodes of the high side drivers, while the incoming current of the winding U comes from the ground rail flowing through the intrinsic diode of the low side driver. Thus, the recirculation loop of the three currents of the windings of the motor closes through the hold capacitor C3 connected between the Vmotor rail and the ground rail.

Every time the configuration of the output bridge stage switches from the "brake" configuration to the "tristate" configuration, the recirculating motor current charges the capacitor C3. This causes the voltage on the Vmotor node to be incremented.

The intrinsic diodes that are created in the integrated structures of the MOSFETs of the output bridge stage have a sensible conduction resistance that causes a non-negligible reduction of the voltage at which the hold capacitor C3 is charged during recirculation phases of the motor windings currents, i.e., when all the MOSFETs of the output bridge stage of the spindle motor are turned off (tristated).

SUMMARY OF THE INVENTION

In view of the foregoing background, an object of the present invention is to enhance the efficiency of energy recovery of a multiphase electric motor.

This and other objects, features and advantages in accordance with the present invention are provided by recirculation of the motor currents through the same MOSFETs of the output bridge stage that are coordinately turned on during the current recirculation phases, instead of through the intrinsic diodes of the integrated structure of the MOSFETs as in the prior art.

Recirculation of the currents (and the charging of the hold capacitor) may take place through fully saturated power MOSFETs, thus providing for a significantly lower voltage drop than the voltage drop that is experienced when recirculating the currents through the intrinsic diodes of the same power MOSFETs.

A method of implementing the step-up function with enhanced efficiency is provided by avoiding the relatively significant voltage drops through the intrinsic diodes of the structure of the power MOSFETs. The method may comprise implementing an active step-up of the spindle motor in which the phase of braking for the power MOSFETs of the output bridge stage may be immediately or finally followed by a phase of active current recirculation during which MOSFETs of the output bridge stage are momentarily turned on in sequence. This is differently from the prior art where the phase of braking was followed by a tristate phase. This may be done to recirculate the currents of the phase windings of the motor through MOSFETs that are momentarily turned on to a fully saturated state, and through the hold capacitor that closes the circuit between the supply node Vmotor and the common ground node of the output power stage.

BRIEF DESCRIPTION OF THE DRAWINGS

The different aspects and features of the present invention will become even more evident through the ensuing description of sample embodiments with reference to the attached drawings, wherein.

DETAILED DESCRIPTION OF THE PREFERRED EMBODIMENTS

Figure 4B:
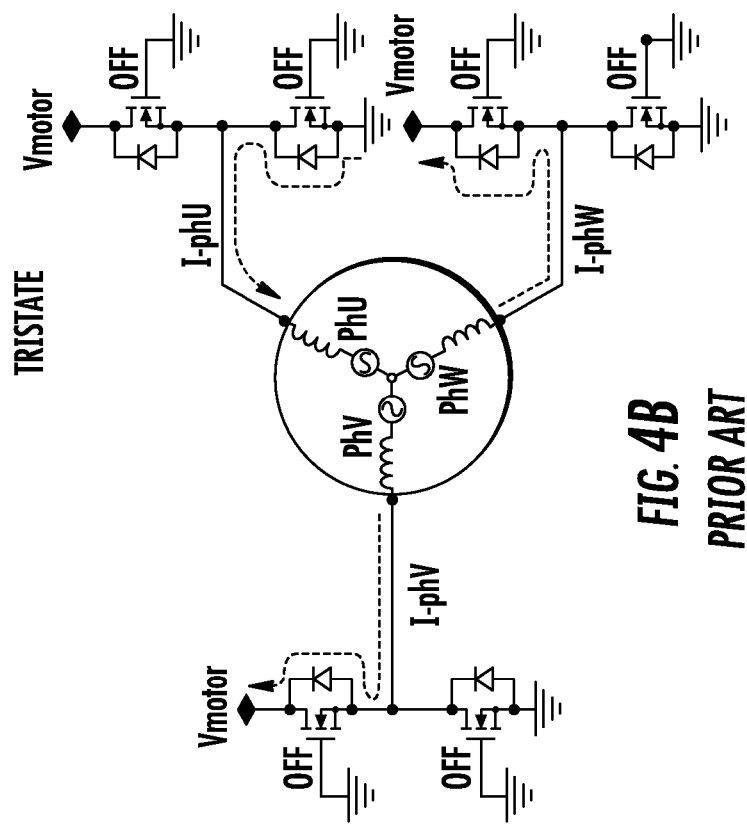
FIGS. 4*a* and 4*b* respectively illustrate the motor current circulation paths during a braking phase and during a tristate phase according to the prior art.
Figure 4A:
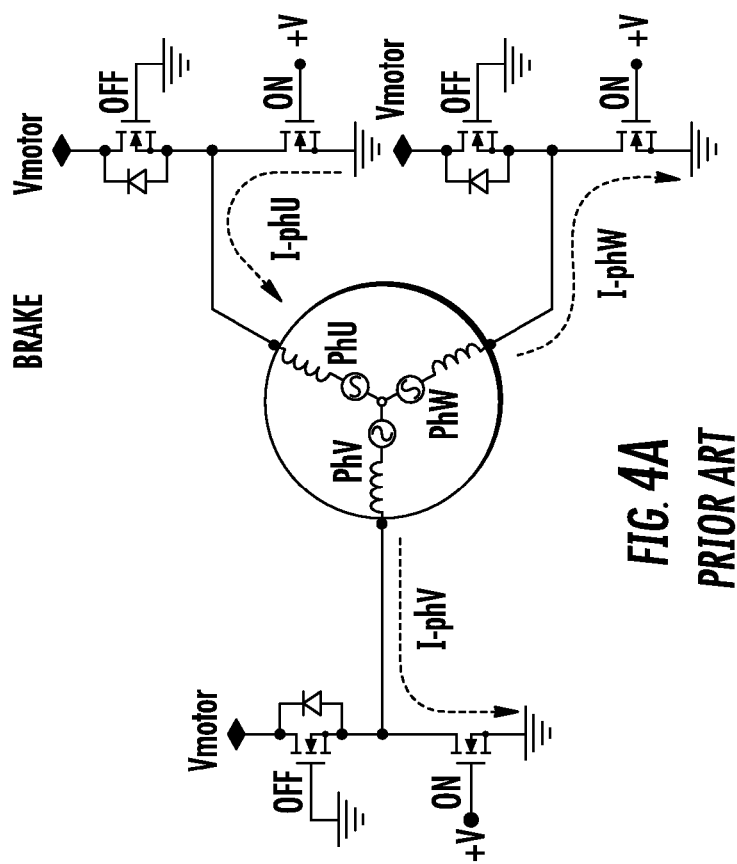
Figure 5B:
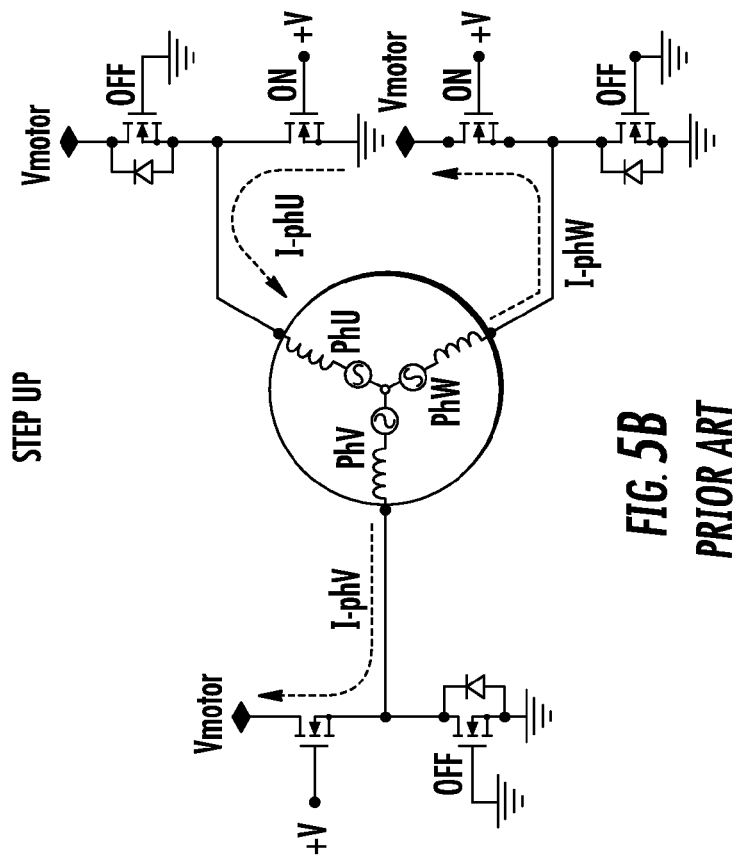
FIGS. 5*a* and 5*b* respectively illustrate the motor current circulation paths during a braking phase and during a phase of active step-up implemented according to the present invention.
Figure 5A:
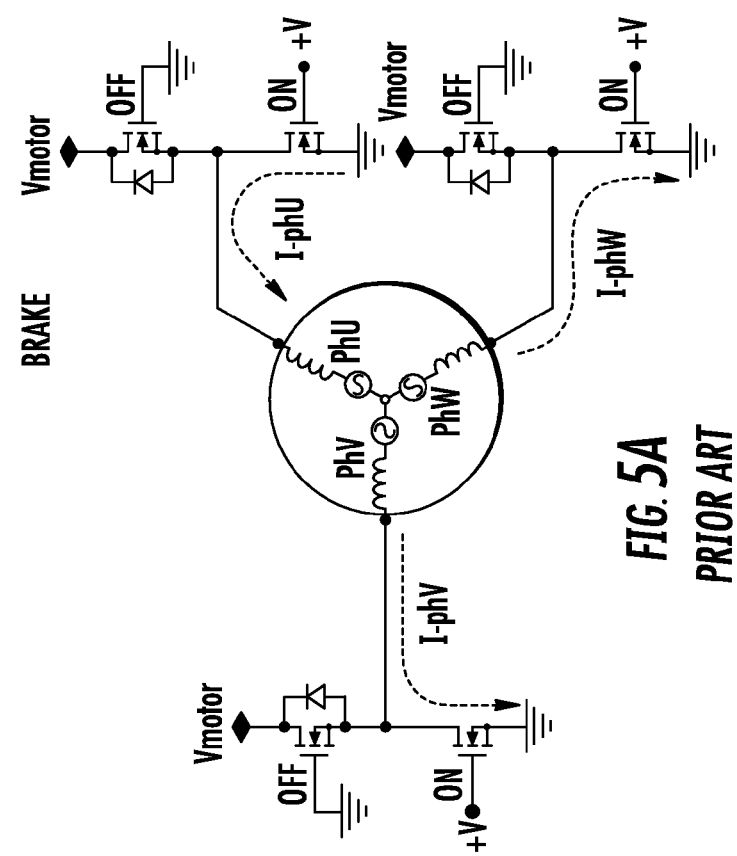

FIGS. 5*a* and 5*b* illustrate one of the six possible circuit configurations of circulation paths of the currents that are generated in the phase winding of the motor during a braking phase as symbolically indicated by the dotted arrows of the three phase currents I-phV, I-phU and I-phW for the same phase of braking that was depicted in FIGS. 4*a* and 4*b*.

Figure 1:
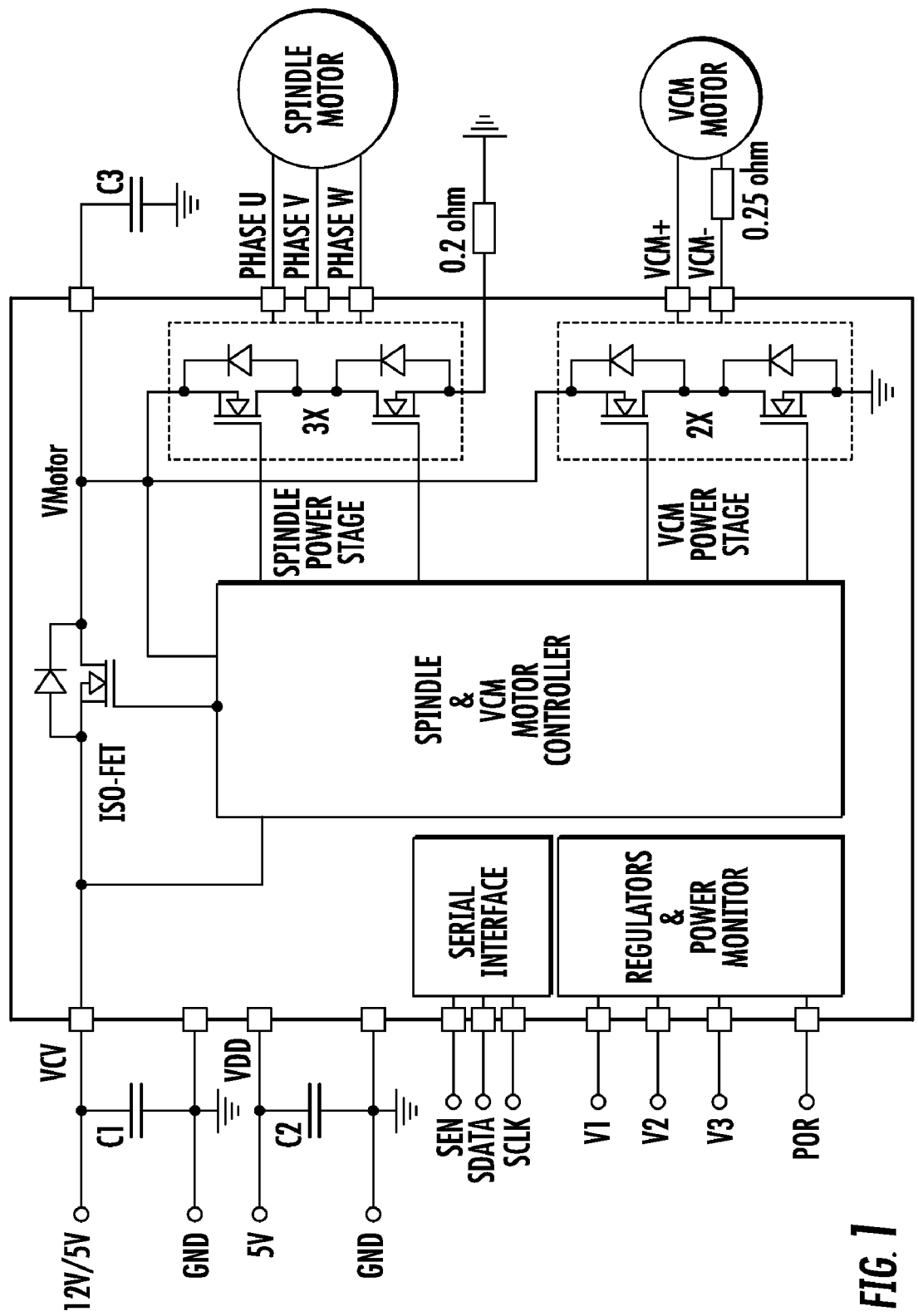
FIGS. 1 and 2 are circuit diagrams of a typical hard disk drive device and of the output bridge stage of a three phase spindle motor according to the prior art.

By observing the circulation paths identified by the dotted arrows that are implemented according to the illustrated embodiment, during the active step-up phase that follows the phase of braking, it is immediately recognized that differently from the prior art situation depicted in FIGS. 4*a* and 4*b*, the three phase currents I-phV, I-phU and I-phW circulate through purposely turned on MOSFETs from the supply node Vmotor to the common ground node. This charges the hold capacitor (C3 in FIG. 1) that is connected between the Vmotor and the ground nodes.

In the example shown, the phase of braking remains unchanged. All low-side MOSFETs are turned on, thus short circuiting the phase windings of the motor. In this condition, the three back electromotive forces generate three currents in the three phase windings polarity. The amplitude of which depends from the angular position and speed of the rotor. For the sample configuration shown, the current in the phase winding U enters the motor while the currents in the other two phase windings V and W exit the motor.

In consideration of the directions that the three phase windings circulate in the motor during the phase of braking and at the end of it, the three MOSFETs as symbolically identifiable in the circuit diagrams of FIGS. 5*a* and 5*b* are turned on. This is instead of bringing the output stage in a high impedance (tristate) state, i.e., with all the MOSFETs turned off. This is done to establish the indicated paths of circulation of the three phase currents I-phV, I-phU and I-phW.

In the configuration (of the six possible) shown in FIGS. 5*a* and 5*b*, after a phase of braking, a phase of active step-up during which the low side MOSFET of the phase winding U and the high side MOSFET of the phase windings V and W are turned on. Of course, with the spindle motor rotating, at the end of each phase of braking there will be one of the six possible combinations of currents in the three phase windings of the motor. This is in consideration of the fact that the signs and amplitudes of the three currents evolve synchronously with the rotor phase. Therefore, the active step-up phase will be implemented by coordinately turning on the correct MOSFET of the three half bridges of output bridge stage of the spindle motor.

In this way, the circulation of the motor currents toward the supply node Vmotor will no longer suffer the relatively large voltage drop that occurs on the intrinsic recirculation diodes of the MOSFETs of the output stage. As a result, a sensible enhancement of the efficiency of energy recovery of the step-up process is achieved that translates itself in an increase of the voltage that is maintained on the Vmotor node. In the prior art techniques, phase current circulation is through the intrinsic diodes of the integrated structure of the tristated MOSFETs of the output bridge stage.

It is evident that in order to implement the more efficient current recirculation, it becomes desirable to know the sign of the phase currents of the motor during the phase of braking in order to selectively turn on the power MOSFETs that will provide for the desired current circulation paths during the successive phase of active step-up.

This requisite may be satisfied in different manners. A first method is to detect the sign of the currents in the phase windings of the motor at the end of the phase of braking by measuring the voltage between the central or output node of each of the three half bridges that define the output bridge stage and the common ground node, provided that the braking is implemented by turning on all the low side MOSFETs.

Referring to the situations depicted in FIGS. 5*a* and 5*b*, in relation to the phase of braking, the measurement of the voltage between the output node of each half bridge and the common ground node results in the output node of the half bridges to which the windings V and W are connected will be at a positive voltage. This is while the output node of the half bridge to which the phase winding U is connected will be at negative voltage. This will indicate that the currents in the phase windings V and W exit the motor while the current in the phase winding U enters the motor.

Figure 6:
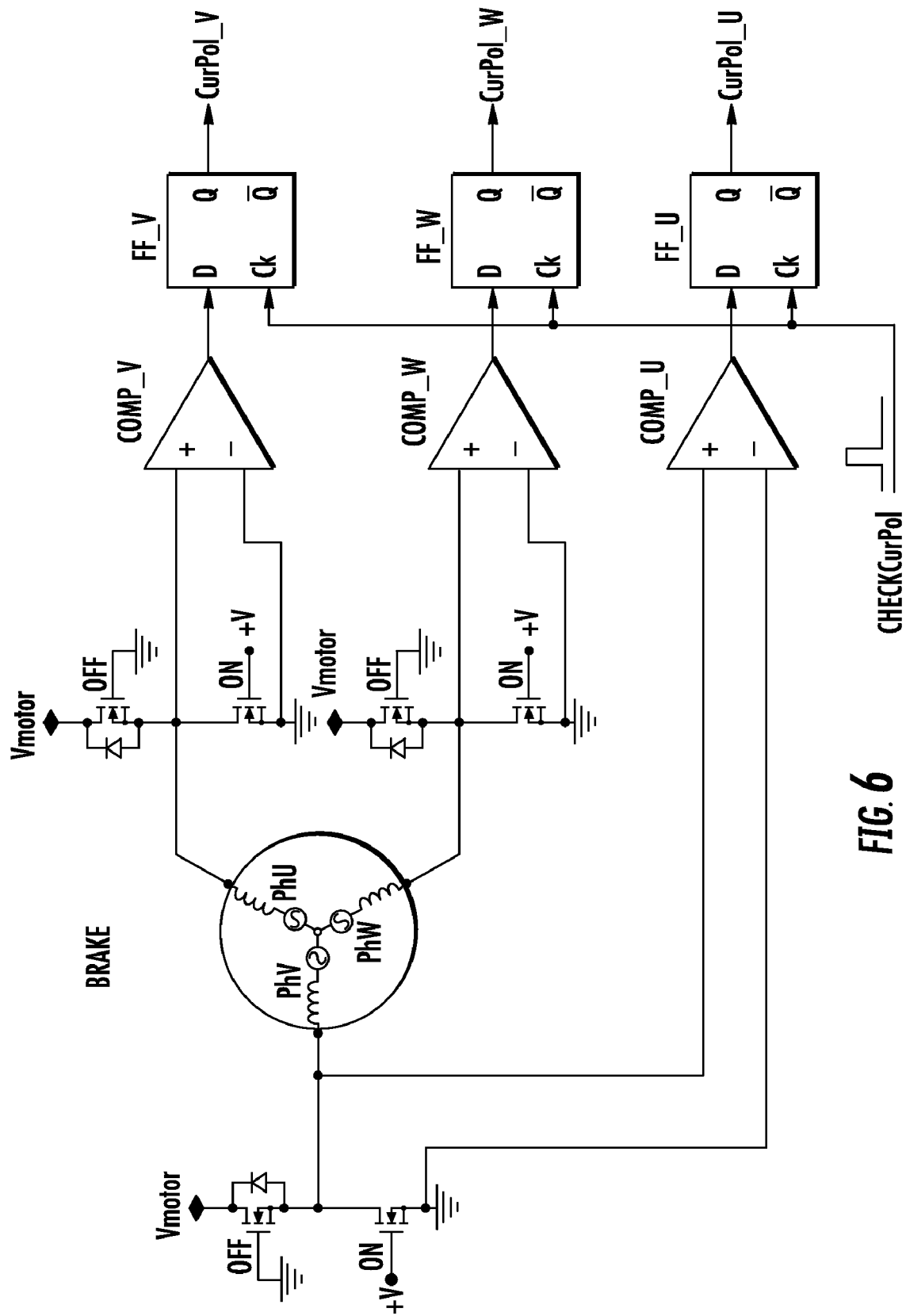
FIG. 6 illustrates a circuit for detecting the sign of the currents in the three phase windings of the motor at the end of a phase of braking according to a first embodiment of the present invention.

FIG. 6 shows a circuit arrangement suitable to detect the polarities of the three phase currents of the motor at the end of the braking phase. The three comparators COMP_V, COMP_W and COMP_U have their non-inverting input (+) connected to the respective output nodes of the half bridges, and their inverting input (−) connected to ground. Therefore, the output of a comparator will be high if the current is exiting the respective phase winding of the motor, or low if the current is entering the phase winding. The outputs of the three comparators are connected to the D inputs of three flip-flops, and the information relative to the state of the outputs of the three comparators, indicating the signs of the three phase currents, is stored in the three flip-flops by the application of a trigger pulse CheckCurPol. The trigger pulse CheckCurPol is synchronous with the termination of a phase of braking.

At the end of the phase of braking, by analyzing the state of the three flip-flop outputs, it is identified which MOSFETs of the output bridge stage need to be turned on in order to implement an active step-up circulation of the three phase currents of the motor through the hold capacitor (C3 in FIG. 1) for charging it. At the end of the active circulation phase, a new braking phase is implemented and this cycle proceeds until the VCM has completed the parking of the read/write head carrying arm of the device on its park ramp.

Figure 2:
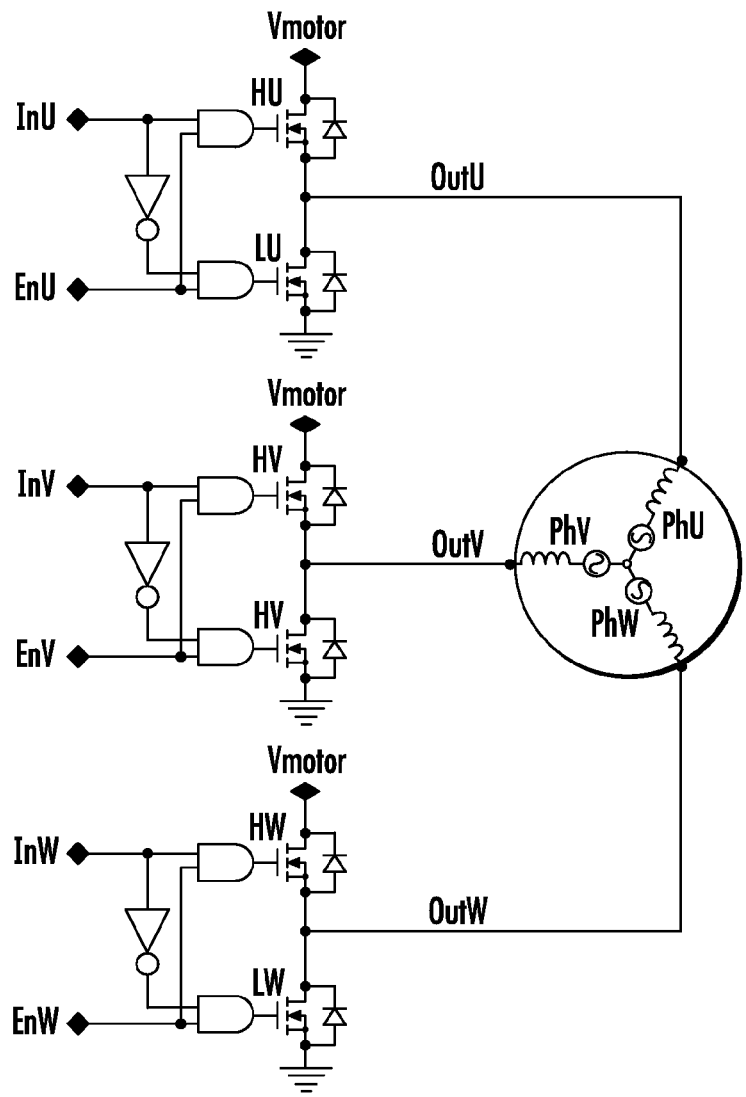
Figure 3:
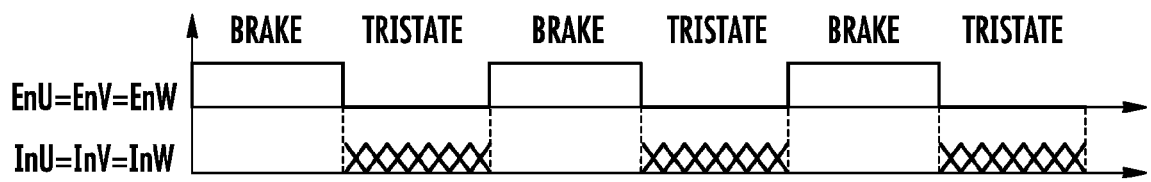
FIG. 3 shows the timing diagram of the control signals of the three half bridge stages that define the output bridge stage of the three phase motor of FIGS. 1 and 2.
Figure 7:
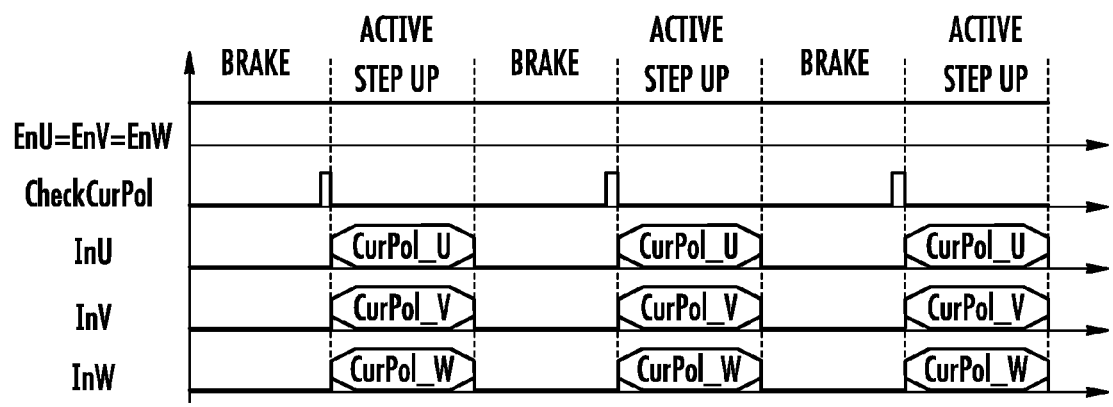
FIG. 7 is a timing diagram showing the relationship between the drive signals of the three half bridges of FIG. 2 with a trigger signal for detecting the sign of the currents in the motor windings, and consequently implementing the active current circulation phase of the step-up function by correctly turning on the power MOSFETs for the recirculation of the currents according to the present invention.

FIG. 7 shows a timing diagram of the driving signals of the three half bridges of FIG. 2, and of the trigger signal CheckCurPol for detecting the signs of the three phase currents for implementing the active step-up through the turning on of the MOSFETs. This establishes circulation paths of the currents through the hold capacitor connected between the Vmotor and the common ground nodes.

In the sample embodiment shown, the enable signals EnU, EnV and EnW of the three half bridges always remain high. During the phase of braking, the inputs of the three half bridges InU, InV and InW are forced to a low state to implement the braking with all the low-side MOSFETs turned on. Finally, during the active step-up phase, the appropriate logic level of the three inputs InU, InV and InW is defined by the output of the three flip-flops of FIG. 6. This is after the CheckCurPol signal has allowed the storing of the signs of the three phase currents at the end of the braking phase just terminated.

Alternatively, in case the braking phase is implemented by turning on all the high side MOSFETs instead of the low side MOSFETs, the arrangement for measuring and establishing the signs of the phase currents will need to be changed accordingly. In such a case, the three comparators of FIG. 6 will have their inverting input (−) connected to the Vmotor node instead of to ground, while their non-inverting input (+) will be connected to the output node of the respective half bridge, as readily understood by those skilled in the art.

An alternative manner of detecting the signs of the phase currents at the end of a braking phase is to introduce a tristate phase of minimum duration. This is eventually programmable before enabling the phase of active step-up with the appropriate turning on of the MOSFETs to circulate the phase currents so as to charge the hold capacitor.

During such a tristate interval of minimum duration, the three currents that are generated by the back electromotive forces of the spindle motor will either circulate toward the node Vmotor or toward the ground node through the intrinsic diodes of MOSFETs of the output stage. This depends on their signs to indicate whether the current entering or exiting the motor.

In case the current of a phase winding exits the motor, it will circulate toward the Vmotor node through the intrinsic diode of the high side MOSFET of the half bridge to which the phase winding is connected. In contrast, if the current is entering the motor, it will circulate through the intrinsic diode of the low side MOSFET of the half bridge to which the winding is connected.

Figure 8:
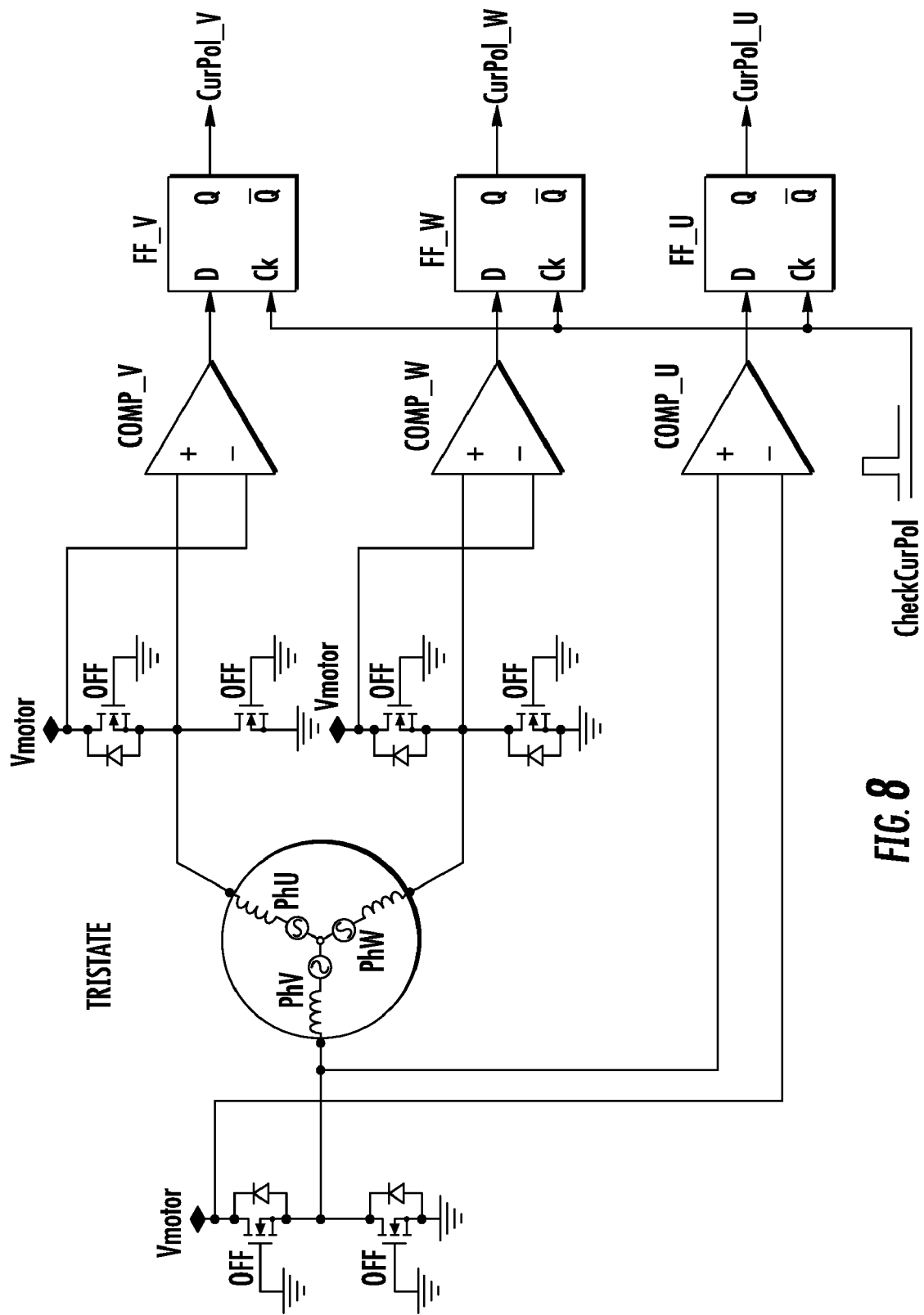
FIG. 8 shows a connection scheme of three comparators and three flip-flops for detecting the sign of the currents in the three phase windings of the motor at the end of a momentary tristate phase introduced between the phase of braking and the phase of active step-up motor current circulation according to an alternative embodiment of the present invention.

By comparing with comparators connected between the output node of each half bridge of the output bridge stage and the Vmotor node, as depicted in FIG. 8, it will be possible to derive the needed information on the direction of the three phase currents of the motor. If the current is exiting the motor and circulating in the intrinsic diode of the high side MOSFET, the output of the relative comparator will be high. If the current is entering the motor and circulating in the intrinsic diode of the low side MOSFET, the output of the comparator will be low.

The CheckCurPol signal that commands the storing of the signs of the three currents will in this embodiment be synchronous with the end of the tristate of minimum duration introduced between the phase of braking and the phase of active step-up.

Another possibility for determining the signs of the three phase currents is to connect the three comparators with their input (−) connected to ground instead of to Vmotor. The positive input (+) of each comparator is connected to the output node of the respective half bridge.

Once the direction of the three phase currents is detected, the short tristate phase is terminated and the active step-up phase is started by turning on the three MOSFETs that will establish the correct circulation paths of the phase currents so as to charge the hold capacitor connected between the Vmotor and the ground nodes. At the end of the active step-up phase, a new phase of braking is started and the cyclic process repeats itself until the VCM of the disk drive has terminated the parking of the head carrying arm.

Figure 9:
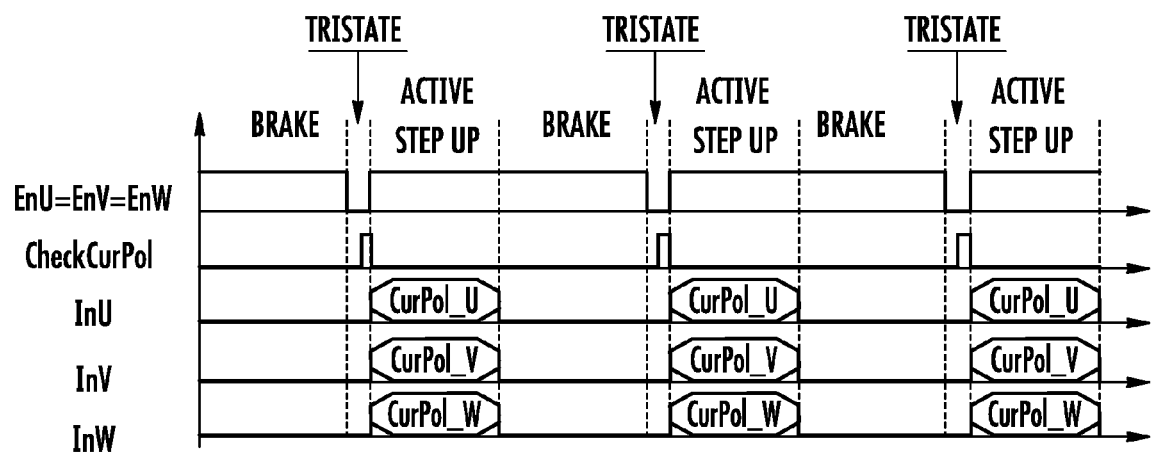
FIG. 9 is a timing diagram showing the relationship between the drive signals of the three half bridges of FIG. 2 with a trigger signal for detecting the sign of the currents in the motor windings at the end of a short tristate internal purposely introduced at the end of the brake phase before starting the active step-up phase according to a different embodiment of the present invention, and consequently implementing the active current circulation phase of step-up by correctly turning on the power MOSFETs for the desired recirculation of the motor currents according to the present invention.

FIG. 9 shows a timing diagram illustrating the relationship between the drive signals of the three half bridges of FIG. 2 with the enable signals and with the trigger signal CheckCurPol for storing the detected signs of the three currents to implement the successive phase of the active step-up by correcting turning on the MOSFETs through which the currents should circulate.

In this case, the enable signals of the three half bridges EnU, EnV and EnW remain at a low level for the minimum time desirable to detect the signs of the three phase currents with the output bridge stages kept momentarily in a tristate condition. In the phase of braking the inputs of the three half bridges InU, InV and InW are forced to a low state for implementing the braking with the low side MOSFET turned on. In the active step-up phase, the logic levels of the three inputs InU, InV and InW are defined by the state of the outputs of the three flip-flops after the trigger signal CheckCurPol has allowed the storing of the signs of the three currents at the end of the tristate phase. Of course, also in this case, the phase of braking may be implemented by turning all the high side MOSFETs instead of all the low side MOSFETs.

Figure 10A:
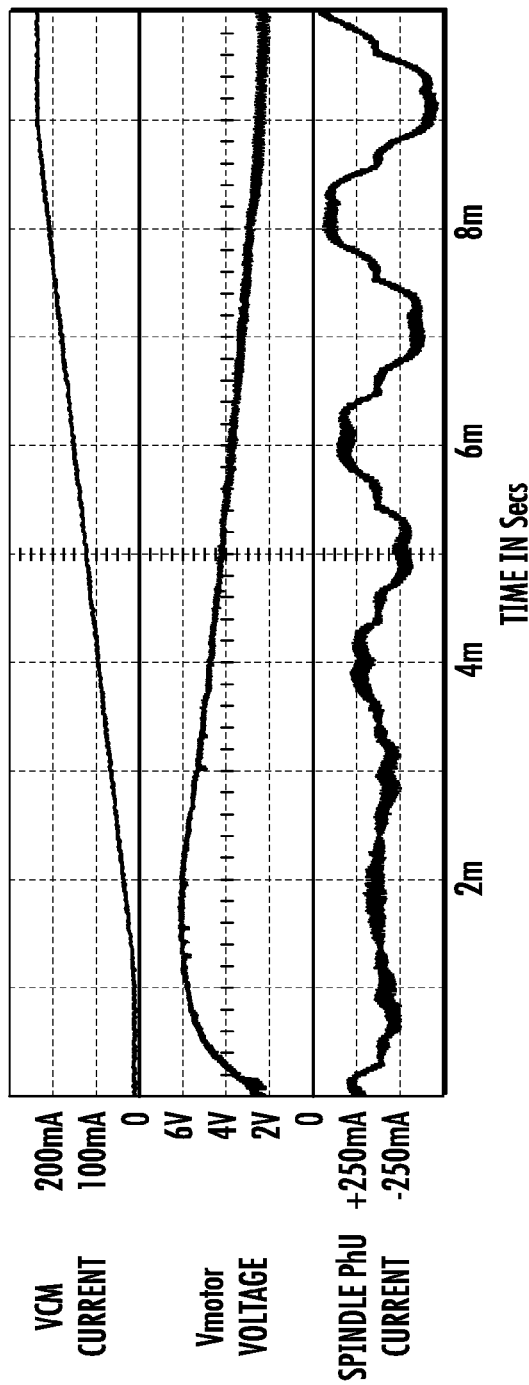
FIGS. 10*a* and 10*b* respectively show the simulated operation of a step-up function according to the prior art, and of an active step-up function according to the present invention.
Figure 10B:
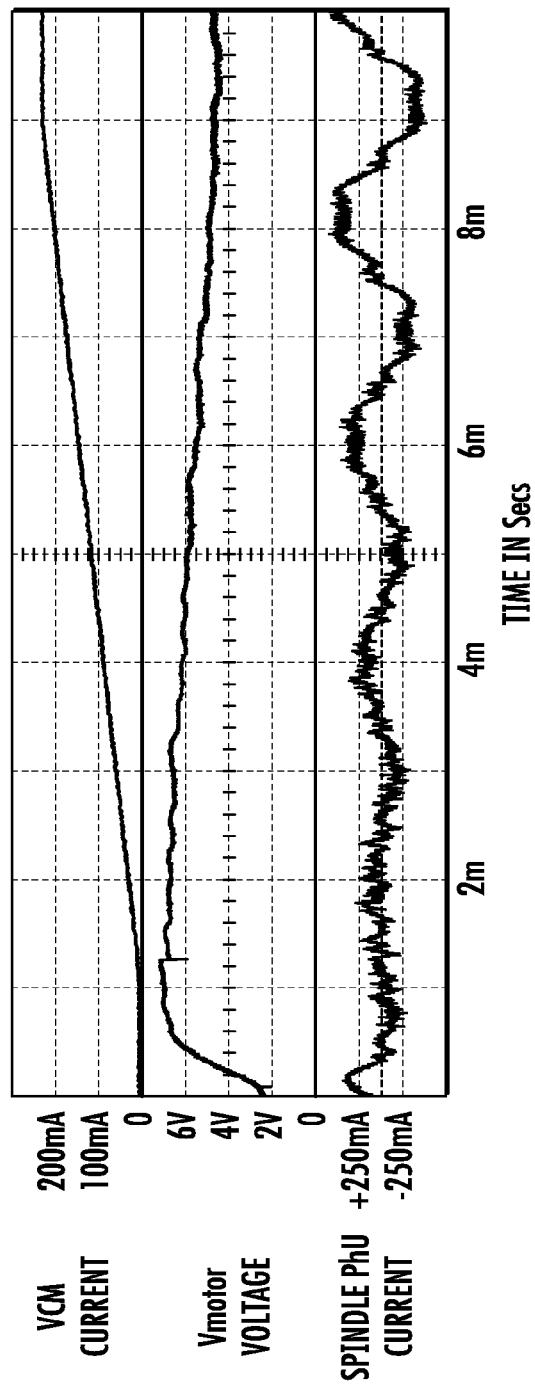

FIGS. 10a and 10b show the simulated results relative to a spindle step-up implemented according to prior art (FIG. 10a) and according to the present invention (FIG. 10b). The curves show the waveforms of the voltage on the Vmotor node, and of the current of a phase winding on the spindle motor in absence of an external power supply and with a current absorption by the voice coil motor (VCM) varying from 10 mA to 220 mA, according to the following conditions.

A hard disk device for mobile applications (5V) includes 1) a spindle motor with a phase to phase winding resistance=2.7 ohm, a phase to phase winding inductance=0.35 mH, a speed=5400 RPM and a phase to phase BEMF at 5400 RPM=4.0 V; 2) a voice coil motor with a winding resistance=7.8 ohm and a winding inductance=0.75 mH; 3) a hold capacitor (C3)=30 μF and 4) a step-up frequency=30 kHz.

As may be observed by comparing the curves, the active step-up carried out according to the illustrated embodiment shows a greater efficiency and leads to the maintenance on the V motor node voltage.

That which is claimed:

1. A method of enhancing the efficiency of energy recovery in charging a hold capacitor coupled between power supply nodes of output MOS transistor bridge stages driving a multiphase spindle motor and a voice coil motor of a disk storage device, the method comprising:

in case of failure of an external power supply of the device, and in order to allow the voice coil motor to complete an emergency ramp loading of a head carrying arm, rectifying currents produced by back electromotive forces in the phase windings of the spindle motor and forcing a rectified charge current through the hold capacitor by switching the MOS transistors of the output half-bridge stages from a braking configuration, wherein either the high-side transistors or the low-side transistors of the half bridges are turned on, to an active step-up current circulation configuration with the transistors of the half bridges being selectively turned on or off in a way such as to circulate the currents of the phase windings of the spindle motor, through selectively turned on transistors of the respective half bridges for charging the hold capacitor.

2. The method of claim 1, wherein the selective turning on of the MOS transistors of the half bridges is determined by a direction of flow of the currents in the phase windings assessed at an end or after concluding each phase of braking and before starting each phase of active step-up current circulation.

3. The method of claim 1, wherein the switching is carried out at an ultra acoustic frequency.

4. The method of claim 1, wherein the directions of flow of the currents in the phase windings of the multiphase spindle motor are assessed by detecting a sign of the voltage referenced to a common reference voltage of an output node of each half bridge coupled to the respective winding of the multiphase spindle motor at an end or after having concluded each phase of braking, and before starting each phase of active step-up current circulation.

5. The method of claim 4, wherein logic values of the detected signs corresponding to the directions of flow of the currents in the phase windings of the multiphase spindle motor are stored in respective latches by a timing pulse synchronous with either the end of each phase of braking or a momentary tristate phase.

6. The method of claim 1, wherein the directions of flow of the currents in the phase windings of the multiphase spindle motor are assessed by detecting a sign of the voltage referenced to a voltage present on the power supply nodes during a momentary phase of high impedance or a tristate phase introduced at an end of phase of braking, and before starting each phase of active step-up current circulation.

7. The method of claim 6, wherein logic values of the detected signs corresponding to the directions of flow of the currents in the phase windings of the multiphase spindle motor are stored in respective latches by a timing pulse synchronous with either the end of each phase of braking or a momentary tristate phase.

8. An output MOS transistor bridge stage for driving a multiphase spindle motor, and comprising:

a power supply node for receiving an external power supply for powering the multiphase spindle motor;

a common reference node;

a plurality of half bridges, each half bridge comprising a plurality of MOS transistors and an output node coupled to a respective phase winding of the multiphase spindle motor;

a plurality of comparators, each comparator having a first input coupled to the output node of a respective half bridge, and a second input coupled to the common reference node; and a plurality of flip flops, each flip flop having an input coupled to an output node of a respective comparator, and a timing input for receiving a synchronization pulse for storing a logic value present at the output of the respective comparator, the logic value representing a sign of current flowing in a corresponding phase winding of the multiphase spindle motor during a phase of braking or during a tristate phase of configuration of the plurality of MOS transistors for rectifying currents produced by back electromotive forces in the respective phase windings for forcing a rectified charge current through a hold capacitor coupled between the power supply node and the common reference node.

9. An output MOS transistor bridge stage of claim 8, further comprising a control circuit for driving said plurality of MOS transistors of said plurality of half bridges.

10. An output MOS transistor bridge stage of claim 8, wherein the power supply and common reference nodes, said plurality of half bridges, said plurality of comparators and said plurality of flip flops are configiured for operating in a hard disk drive.

11. A hard disk drive comprising:
   a multiphase spindle motor comprising a plurality of phase windings;
   a power supply node for receiving an external power supply for powering said multiphase spindle motor;
   a common reference node;
   a hold capacitor coupled between said power supply node and said common reference node; and
   an output MOS transistor bridge stage driving said multiphase spindle motor, and comprising
      a plurality of half bridges, each half bridge comprising a plurality of MOS transistors and an output node coupled to a respective phase winding of said multiphase spindle motor,
      a plurality of comparators, each comparator having a first input coupled to the output node of a respective half bridge, and a second input coupled to the common reference node, and
      a plurality of flip flops, each flip flop having an input coupled to an output node of a respective comparator, and a timing input for receiving a synchronization pulse for storing a logic value present at an output of the respective comparator, the logic value representing a sign of current flowing in a corresponding phase winding of said multiphase spindle motor during a phase of braking or during a tristate phase of configuration of the plurality of MOS transistors for rectifying currents produced by back electromotive forces in the respective phase windings for forcing a rectified charge current through said hold capacitor.

12. A hard disk drive of claim 11, further comprising a voice coil motor for controlling a head carrying arm, and wherein in case of failure of the external power supply, said hold capacitor allows said voice coil motor to complete an emergency ramp loading of the head carrying arm.

13. A hard disk drive of claim 11, further comprising a control circuit for driving said plurality of MOS transistors of said plurality of half bridges.

14. A driving circuit for a multiphase spindle water and a voice coil motor comprising:
   a plurality of half bridges, each half bridge comprising a plurality of MOS transistors and an output node coupled to a respective phase winding of the multiphase spindle motor; and
   a control circuit for performing in case of failure of an external power supply, and to allow the voice coil motor to complete an emergency ramp loading, the following rectifying currents produced by back electromotive forces in the phase windings of the spindle motor, and forcing a rectified charge current through the hold capacitor by switching the MOS transistors of the output half-bridge stages from a braking configuration, wherein either the high-side transistors or the low-side transistors of the half bridges are turned on, to an active step-up current circulation configuration with the transistors of said half bridges being selectively turned on or off in a way such as to circulate the currents of the phase windings of the spindle motor, through selectively turned on transistors of the respective half bridges for charging the hold capacitor.

15. An output MOS transistor bridge stage of claim 14, wherein the selective turning on of the MOS transistors of the half bridges is determined by a direction of flow of the currents in the phase windings assessed at an end or after concluding each phase of braking and before starting each phase of active step-up current circulation.

16. An output MOS transistor bridge stage of claim 14, wherein the switching is carried out at an ultra acoustic frequency.

17. An output MOS transistor bridge stage of claim 14, wherein the directions of flow of the currents in the phase windings of the multiphase spindle motor are assessed by detecting a sign of the voltage referenced to a common reference voltage of the output node of each half bridge coupled to the respective winding of the multiphase spindle motor at an end or after having concluded each phase of braking, and before starting each phase of active step-up current circulation.

18. An output MOS transistor bridge stage of claim 17, wherein logic values of the detected signs corresponding to the directions of flow of the currents in the phase windings of the multiphase spindle motor are stored in respective latches by a timing pulse synchronous with either the end of each phase of braking or a momentary tristate phase.

19. An output MOS transistor bridge stage of claim 14, wherein the directions of flow of the currents in the phase windings of the multiphase spindle motor are assessed by detecting a sign of the voltage referenced to a voltage present on the power supply nodes during a momentary phase of high impedance or a tristate phase introduced at an end of phase of braking, and before starting each phase of active step-up current circulation.

20. An output MOS transistor bridge stage of claim 19, wherein logic values of the detected signs corresponding to the directions of flow of the currents in the phase windings of the multiphase spindle motor are stored in respective latches by a timing pulse synchronous with either the end of each phase of braking or a momentary tristate phase.

21. A driving circuit for a multiphase spindle motor and a voice coil motor comprising:
   a plurality of half bridges, each half bridge comprising a plurality of MOS transistors and an output node coupled to a respective phase winding of the multiphase spindle motor;
   a plurality of comparators, each comparator having a first input coupled to the output node of a respective half bridge, and a second input coupled to a common reference node; and
   a plurality of flip flops, each flip flop having an input coupled to an output node of a respective comparator, and a timing input for receiving a synchronization pulse for storing a logic value present at the output of the respective comparator, the logic value representing a sign of current flowing in a corresponding phase winding of the multiphase spindle motor during a phase of braking or during a tristate phase of configuration of the plurality of MOS transistors for rectifying currents produced by back electromotive forces in the respective phase windings for forcing a rectified charge current through a hold capacitor coupled between a power supply node and the common reference node.

22. A driving circuit of claim 21, further comprising a control circuit for driving said plurality of MOS transistors of said plurality of half bridges.

23. A driving circuit of claim 21, wherein the driving circuit is for operating in a hard disk drive.

* * * * *

UNITED STATES PATENT AND TRADEMARK OFFICE
CERTIFICATE OF CORRECTION

PATENT NO. : 7,705,548 B2  Page 1 of 1
APPLICATION NO. : 11/754686
DATED : April 27, 2010
INVENTOR(S) : Galbiati It is certified that error appears in the above-identified patent and that said Letters Patent is hereby corrected as shown below:

Column 1, Line 22      Delete: "hark"
                       Insert: --hard--

Column 3, Line 45      Delete: "differently"
                       Insert: --different--

Column 5, Line 17      Delete: "of output"
                       Insert: --of the output--

Column 6, Line 49      Delete: "current entering"
                       Insert: --current is entering--

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,705,548 B2  
APPLICATION NO. : 11/754686  
DATED : April 27, 2010  
INVENTOR(S) : Galbiati Page 1 of 1

It is certified that error appears in the above-identified patent and that said Letters Patent is hereby corrected as shown below:

Column 9, Line 57  Delete: "water"  
Insert: --motor--

Column 10, Line 13  Delete: "An output MOS transistor bridge stage"  
Insert: --A driving circuit--

Column 10, Line 19  Delete: "An output MOS transistor bridge stage"  
Insert: --A driving circuit--

Column 10, Line 22  Delete: "An output MOS transistor bridge stage"  
Insert: --A driving circuit--

Column 10, Line 32  Delete: "An output MOS transistor bridge stage"  
Insert: --A driving circuit--

Column 10, Line 38  Delete: "An output MOS transistor bridge stage"  
Insert: --A driving circuit--

Column 10, Line 46  Delete: "An output MOS transistor bridge stage"  
Insert: --A driving circuit--

Signed and Sealed this  
Thirtieth Day of August, 2011

David J. Kappos  
*Director of the United States Patent and Trademark Office*